Manuel H. Gorin
Will Swerdloff
INVENTORS

BY Sidney A. Johnson
ATTORNEY

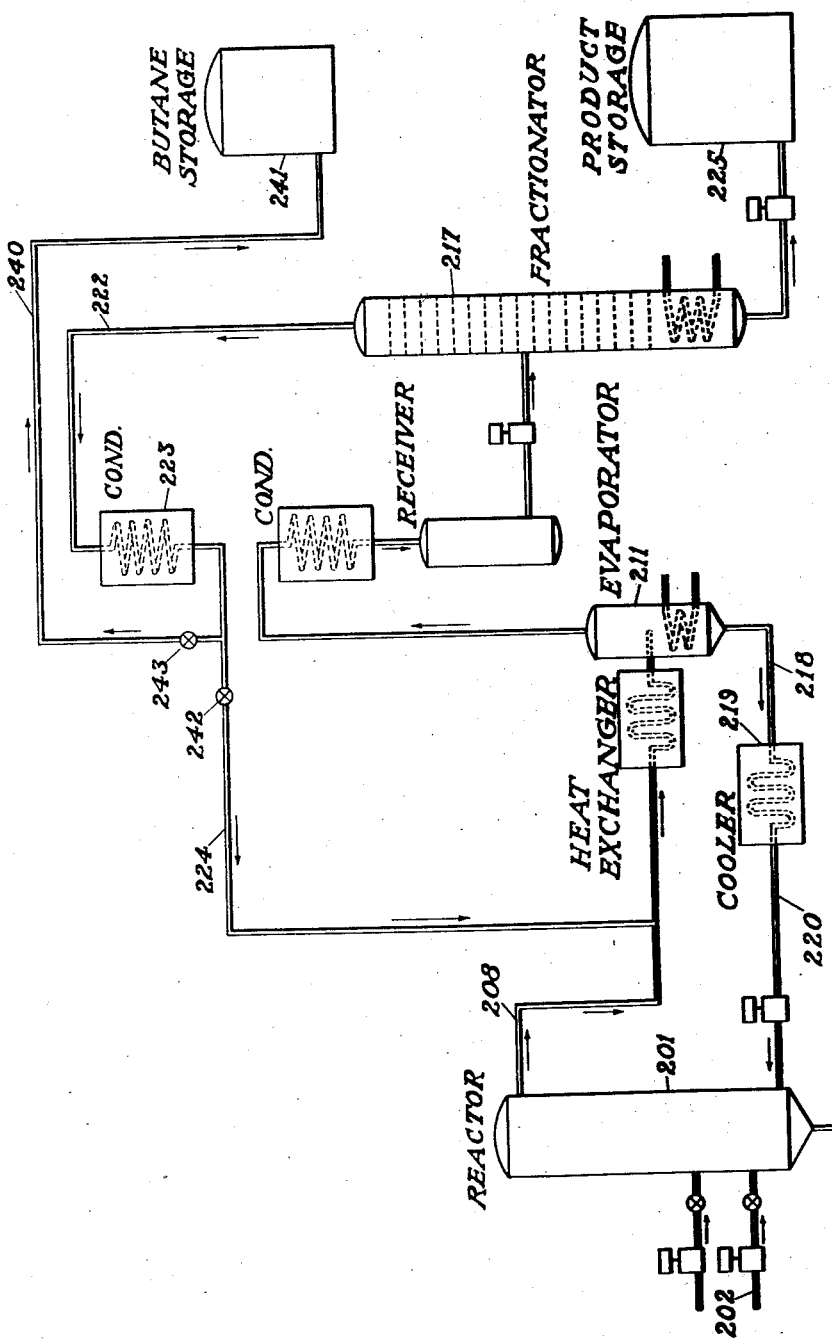

Patented Dec. 3, 1946

2,412,143

UNITED STATES PATENT OFFICE 2,412,143

SEPARATION AND RECOVERY OF SOLUBLE CATALYST IN HYDROCARBON CONVERSION REACTIONS

Manuel H. Gorin and Will Swerdloff, Dallas, Tex., assignors, by mesne assignments, to Socony-Vacuum Oil Company, Incorporated, New York, N. Y., a corporation of New York Application April 23, 1945, Serial No. 589,850

7 Claims. (Cl. 260—683.4)

This invention relates to low temperature hydrocarbon conversion processes such as the alkylation, isomerization, reforming and the like of light hydrocarbons.

More particularly this invention relates to such low temperature hydrocarbon conversion processes which are carried out with the aid of hydrocarbon soluble catalysts for the particular reaction involved.

The use of hydrocarbon soluble catalysts in solution in a hydrocarbon to effect an alkylation reaction has been disclosed in copending application Serial Number 416,864, filed October 28, 1941, now U. S. Patent 2,401,925, and to effect a reforming reaction has been disclosed in copending application Serial Number 412,108, filed September 24, 1941, now U. S. Patent 2,383,123, both by Manuel H. Gorin. The use of such catalysts to effect isomerization reactions is known. The process of this invention is applicable to any low temperature hydrocarbon conversion reaction carried out with the aid of any hydrocarbon soluble isomerization, reforming or alkylation catalyst. Aluminum bromide is a particularly useful catalyst for these reactions. Examples of other suitable catalysts of the type with which the process of this invention is concerned are dialkyl aluminum chlorides, aluminum iodide, stannic chloride, dialkyl boron halides and the like.

The hydrocarbon soluble catalysts are of value in these low temperature hydrocarbon conversion processes because of the ease with which intimate contact between the catalyst and the reactants may be obtained. Because of the excellent contact obtained between the catalyst and the reactants, no special agitating or mixing equipment is required, as is necessary where an immiscible liquid is the catalytic agent used. Likewise in comparison with solid catalysts a much smaller amount of catalyst is required for the same efficiency of contacting, since there is molecular contact between catalyst and the reactants. Another advantage obtained by the use of soluble catalysts as compared with solid or immiscible liquid catalysts is that the concentration of the catalyst in the reaction mixture may be varied. In many of these hydrocarbon conversion reactions the same reactants may combine in different ways to form several products. By varying the catalyst concentration, the reaction may be made to shift in favor of a particular reaction to give a desired product as the major product of the interaction of the particular hydrocarbon reactant mixture.

The primary problem encountered in the use of the soluble catalysts, which is not encountered in the broad sense in the case of the use of insoluble catalysts, is that of separation of the main portion of the products from the major portion of the reactants and catalyst. It is, therefore, a primary object of this invention to provide for the ready separation of product and catalyst, and for the recirculation of the latter back to the reaction mixture.

Another object of this invention is to provide a method for the separation of product and catalyst which may be carried out continuously, and which will not tie down the rate and conditions for carrying out the reaction to the rate and conditions used for the separation of product, catalyst and unreacted hydrocarbons.

Other objects of the invention will be apparent from the description thereof, and from the appended claims.

The general procedure followed in carrying out the hydrocarbon conversion process which forms the subject matter of our invention is to introduce the hydrocarbon and other reactants, if required, into a reaction zone, along with a hydrocarbon soluble catalyst; withdraw a portion of the reaction mixture containing products, unchanged reactants, and dissolved catalyst to a separation zone; divide the mixture into two fractions in the separation zone, one consisting principally of a solution of catalyst in unchanged reactants and/or product, which is recirculated directly back to the reaction zone, and the other, consisting essentially of product accompanied by varying amounts of unchanged reactants, is drawn off for subsequent recovery of the product. The product in this second fraction may be separated from the unchanged reactants, and minor amounts of catalyst carried along therewith, by any suitable method, and the particular method chosen will depend to some extent on the characteristics of the product and reactants in the particular hydrocarbon conversion process to which our method is applied. Generally a fractional distillation of unchanged reactants from the product will be the most economical and the preferred method.

The method used to separate the bulk of the product from the bulk of the catalyst in the separation zone is that of evaporation. A condition essential for the successful operation of the process is, therefore, that the boiling points of the product be sufficiently above that of the catalyst at some pressure at which operation of the evaporator is feasible so that the product may be vaporized while the catalyst will largely remain as a liquid. But it is not strictly essential that the boiling points of the reactant or the various reactants be different from the boiling points of either the product or catalyst. In those cases where the product is lower boiling than the reactants, the process has the additional advantage of sepaarting the product more or less completely from the reactants, as well as from the catalyst. Where the reactants are lower boiling than the product, sufficient reactant must be vaporized to carry over the product and separate it from the catalyst. In some cases where the product may be considerably higher boiling than the reactants, it is desirable to add to the reaction mixture a light volatile hydrocarbon or other inert volatile liquid or gas, which will not react with the catalyst used, as a stripping agent. This stripping agent may be added to the reaction mixture either in the reactor, or just prior to entry into the separation zone, or separately into the sepaartion zone itself. The volatilization of this added light hydrocarbon or the passage of the inert gas through the separation zone will assist in the carrying over of the product.

Sufficient hydrocarbons must be associated with the catalyst leaving the separation zone to keep the catalyst in solution, and thus avoid any undesirable precipitation of the catalyst. This imposes a limit upon the amount of hydrocarbons which may be vaporized in the separation zone. Where the product is more volatile than the unreacted hydrocarbons, these unreacted hydrocarbons furnish the necessary catalyst solvent. In the case where the reactant is more volatile than the product, a considerable quantity of product along with some reactant may be recycled with the catalyst and returned to the reaction zone.

Our invention may be best understood from the following description thereof in conjunction with the discussion of the drawings:

In the drawings:

Figure 3 shows diagrammatically an apparatus for carrying out the invention when applied to a reforming reaction of the type in which a natural gasoline is reformed to yield a product having a higher octane rating.

Figure 1:
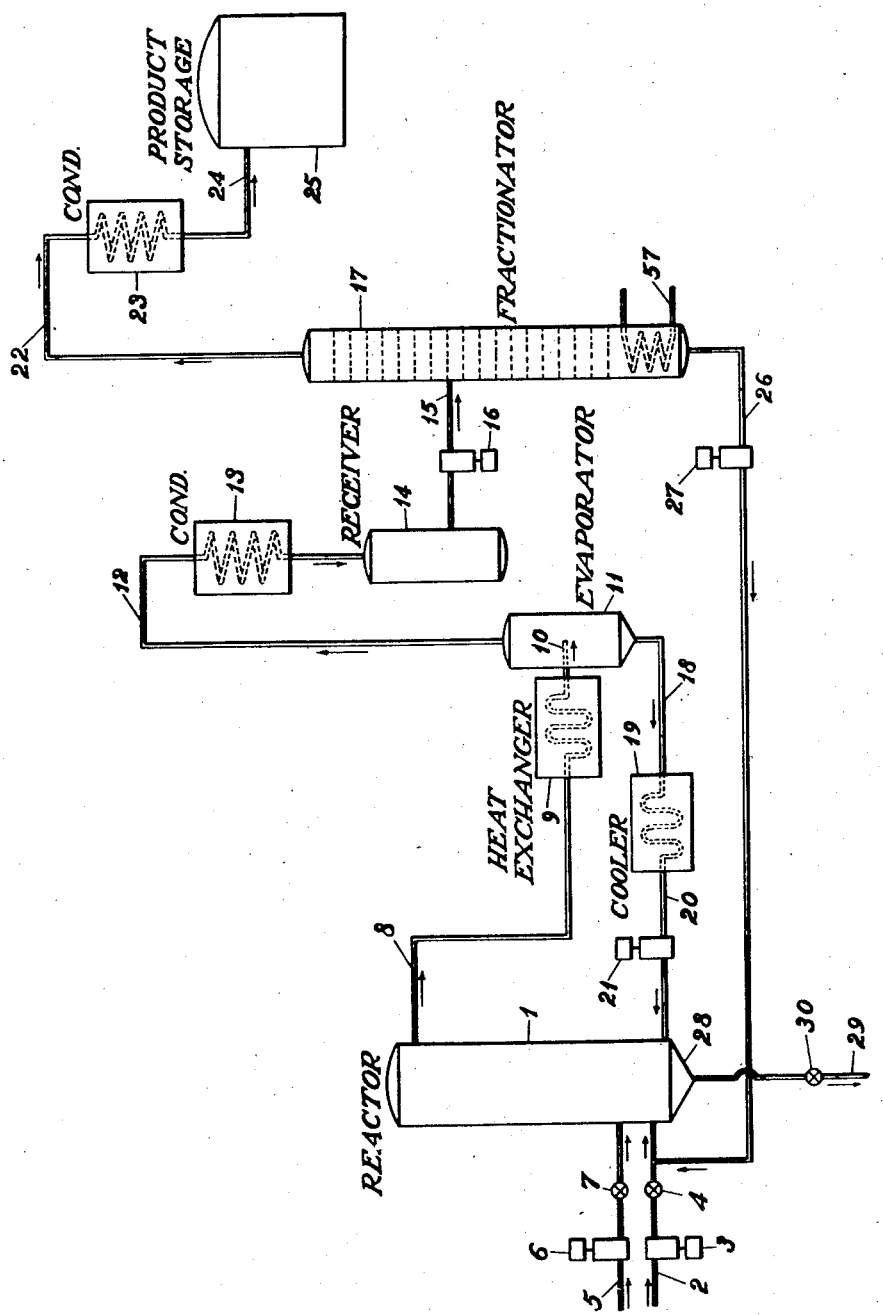
Figure 1 shows diagrammatically an apparatus for carrying out the invention when applied to an isomerization reaction in which the product isomer is lower boiling than the reactant isomer.

Referring to Figure 1, a hydrocarbon charging stock, such as normal butane, is fed into reactor 1, through line 2, in which is located pump 3 and valve 4. Make up aluminum bromide, or other soluble catalyst, preferably in solution in normal butane is fed into the reactor through line 5, provided with pump 6 and valve 7. In reactor 1, the charge stock is maintained at a temperature favorable to the isomerization reaction which progresses therein, and at a pressure sufficient to maintain the normal butane in the liquid phase. The reaction mixture flows out through line 8 to heat exchanger 9, wherein the necessary heat of vaporization is supplied to it. From the heat exchanger the mixture flows through line 10 to evaporator 11 in which the vapors are separated from the liquid. In evaporator 11 the more volatile isobutane and a portion of the normal butane are converted to vapor and pass out through line 12 to condenser 13, from which the condensate collects in receiver 14. The condensate then passes from the receiver through line 15, provided with pump 16 to fractionator 17, wherein the two isomers are separated.

The higher boiling catalyst and much of the normal butane together with some isobutane remain in the liquid state, and flow from the bottom of the evaporator, through line 18 to a cooler 19, wherein they are brought back to the temperature in the reactor, and returned to the reactor, through line 20, which is provided with a suitable pump 21.

The temperature of the reaction mixture going to the evaporator, and the conditions therein are adjusted so as to evaporate the isobutane as completely as possible without throwing out of solution or evaporating any appreciable amount of catalyst. The distribution of the normal paraffin between overhead and bottoms will, of course, depend upon the evaporator design, conditions of operation, and upon the degree of proximity of the boiling points of the reactant isomer and the product isomer.

In fractionator 17 the product, isobutane, is separated from normal butane and passes overhead through line 22 to condenser 23 and then through line 24 to storage tank 25. Suitable means (not shown) are provided to furnish necessary reflux for fractionation. The normal butane, in the bottoms from the fractionator, passes through line 26, provided with pump 27 to line 2, where it mixes with the normal butane feed into the reactor.

Reactor 1 is provided with a conical bottom 28 in which spent catalyst, in the form of a complex between the catalyst and hydrocarbons, collects. This spent catalyst is either drawn off continuously or drawn off from time to time as it accumulates, through line 29, controlled by valve 30 for purification and recovery.

Figure 2:
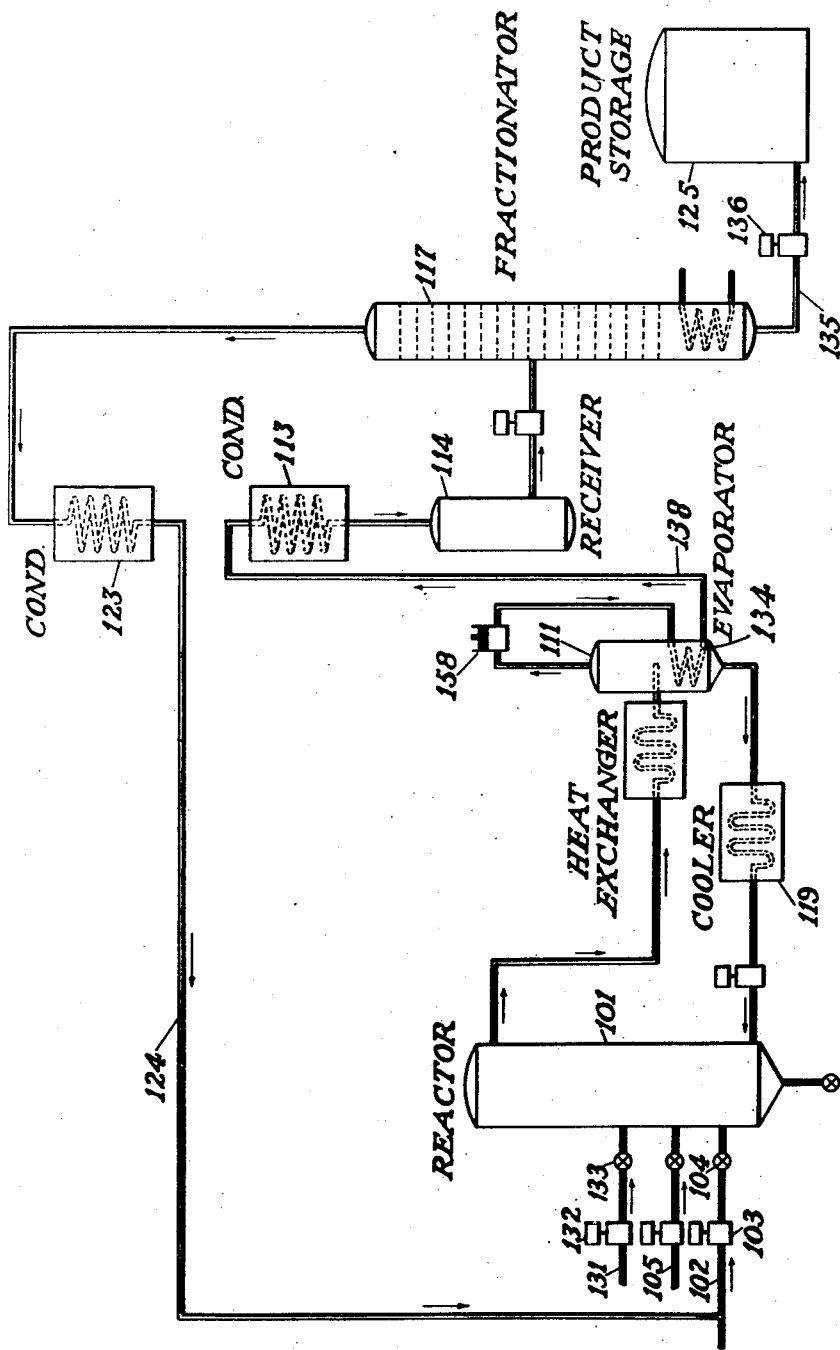
Figure 2 shows diagrammatically an apparatus for carrying out the invention when applied to an alkylation reaction.

Figure 2 shows the principles of our invention applied to an alkylation reaction. An isoparaffin, such as isobutane, is fed to reactor 101, through line 102, provided with pump 103 and valve 104. Make up aluminum bromide, preferably in solution in isobutane, is introduced into the reactor thruugh line 105 in the same manner as described in the discussion of Figure 1. An alkylating agent such as propylene is introduced into reactor 101, through line 131, provided with pump 132 and valve 133. The reaction mixture after being heated as described in the discussion of Figure 1, is fed into the evaporating concentrator 111, which is provided with heating coil 134 to furnish part of the necessary heat of vaporization. In the case of an alkylation reaction, the product, in this case branched chain heptanes, is higher boiling than the unreacted reactant, isobutane, in the reaction mixture. The mixture must be heated sufficiently to vaporize the desired amount of the heptanes. Naturally a considerable proportion of the lower boiling isobutane vaporizes also. In alkylation reactions, as is well known in the art, it is customary to have a considerable excess of the isoparaffin reactant to minimize side reactions of the olefin. The vaporization of this isobutane helps carry over the heptanes. The higher boiling catalyst and a sufficient amount of hydrocarbons to keep it in solution flow from evaporator 111 back to reactor 101, after being cooled to reaction temperature in cooler 119 in the manner described above.

The vapors from evaporator 111 are condensed and sent to fractionator 117, wherein the heptanes and isobutane are separated. The condensation may be effected by cooling as shown in Figure 1; or alternatively, to furnish much of the necessary heat of vaporization, the vapors are compressed by compressor 158 and passed through heating coil 134, wherein at least a portion of the vapors condense and thus heat of condensation furnishes much of the necessary heat of vaporization. The overhead is then passed via line 138 through condenser 113 to condense any uncondensed vapors and the total condensate passed to receiver 114. In the case of the alkylation reaction, the product is the higher boiling and is drawn off from the bottom of the fractionator for storage in tank 125. The isobutane vapor passes overhead and is condensed in condenser 123 and returned to reactor 101, through line 124, where it joins with the isobutane feed line 102. The product passes to storage tank 125, through line 135, provided with pump 136.

Figure 3 shows the principles of our invention applied to a typical reforming process in which a natural gasoline is reformed in the presence of a soluble catalyst such as aluminum bromide to give a product having a higher octane rating. The natural gasoline, containing 5 to 9 carbon atom hydrocarbons is fed into the reactor 201, through line 202, and aluminum bromide is introduced in the manner previously described. The reactor effluent is transferred via line 208 to evaporator 211. Evaporator 211 is operated under conditions so that the gasoline, and lower boiling hydrocarbons are vaporized and carried over after condensation to fractionator 217. To secure the desired vaporization it is usually desirable to introduce some C₄ hydrocarbons into the reaction mixture prior to their passage into the evaporator. The necessary C₄ hydrocarbons are introduced through line 224 to line 208, carrying the reaction mixture. During the reforming operation some C₄ hydrocarbons are produced, as well as some higher boiling hydrocarbons of from 10 to 12 carbon atoms. Additional C₄ hydrocarbons, however, make it possible to vaporize the desired fraction without excessive heating of the reaction mixture, thus minimizing catalyst vaporization and undesirable side reactions.

The material not vaporized in evaporator 211 mainly hydrocarbons of 10 to 12 carbon atoms and the catalyst is recycled via line 218, cooler 219, and line 220 to reactor 201. In the reactor these long chain hydrocarbons reform to shorter chain carbon atom hydrocarbons.

The vapor from the evaporator passes to fractionator 217 wherein the C₄ hydrocarbons are separated from the gasoline boiling hydrocarbons, which are removed as bottoms and sent to storage tank 225. The butane vapors are passed overhead via line 222, condensed in condenser 223, and returned to the process to carry over more gasoline boiling product through line 224. As mentioned above, some butanes are formed in the process, and to prevent a continuous accumulation of butanes in the system, the excess butanes formed are removed through line 240, and accumulated in storage tank 241. Valves 242 and 243 are provided in lines 224 and 240, respectively, to control the division of flow of the butane.

The following examples illustrate the manner of carrying out our invention:

*Example I*

A mixture of 3.41 gallons of feed containing 3.10 gallons of n-butane plus 0.031 gallon of aluminum bromide is added per hour to a reactor maintained at a temperature of 168° F. and at a pressure of 5 atmospheres absolute. The rate of discharge of the mixture from the reactor was 3.44 gallons per hour. The composition of the reactor discharge was 2.17 gallons of n-butane, 1.21 gallons of isobutane, 0.029 gallon of aluminum bromide, and the balance was principally isopentane. This mixture was then passed to a concentrating evaporator operated at a temperature of 75° F. and at a pressure of 41 pounds per square inch absolute. The amount of condensed vapor removed overhead per hour from the evaporator was 2.75 gallons. The composition of this overhead was 1.74 gallons of n-butane, 1.00 gallon of isobutane, and 0.01 gallon of isopentane. The bottoms from the evaporator consisted of catalyst concentrate and amounted to 0.69 gallon per hour, of which 0.028 gallon was aluminum bromide, 0.44 gallon was n-butane, 0.21 gallon was isobutane and 0.01 gallon was isopentane. This catalyst concentrate was returned to the reactor.

The condensed overhead was passed to a fractionator feed tank operated at a pressure of 69 pounds per square inch absolute, and at a temperature of 110° F. from which it was fed to the fractionator for separating the isobutane product, 0.98 gallon per hour from the n-butane. The n-butane was returned to the reactor.

The total material returned to the reactor was 0.028 gallon per hour of catalyst returned in the catalyst concentrate, 2.18 gallons per hour of n-butane, of which 0.44 gallon was returned with the catalyst concentrate, 0.21 gallon per hour of isobutane in the catalyst concentrate, and 0.02 gallon per hour of isopentane. With steady state conditions in order to maintain a total feed return to the reactor of 3.41 gallons per hour, 0.97 gallon of fresh feed was added per hour, of which 0.93 gallon or 96% was n-butane. Make up catalyst in an amount of 0.003 gallon per hour was required.

*Example II*

To a reactor operated at a temperature of 110° F. and at a pressure of 200 pounds per square inch absolute was fed 0.87 gallon of ethylene per hour and 1.22 gallons per hour of raw isobutane feed, containing 1.20 gallons of isobutane. Recycled hydrocarbons and catalyst in an amount of 4.58 gallons per hour were returned to the reactor in the manner described below. The discharge from the reactor was 6.13 gallons per hour, of which 4.07 gallons represented unreacted isobutane, 1.04 gallons represented the hexane products and the balance hydrocarbons of from 3 to 10 carbon atoms, predominantly n-butane, octanes and decanes.

The reaction mixture was fed to an evaporator maintained at a pressure of 8.1 pounds per square inch absolute and at a temperature of 125° F. The overhead from the evaporator represented 5.77 gallons per hour, of which 4.04 gallons were isobutane and 1.00 gallon was hexane. The bottoms from the evaporator were 0.36 gallon per hour of hydrocarbons containing substantially all of the catalyst, and were recycled directly to the reactor. The overhead from the evaporator was sent to a fractionator (deisobutanizer) feed tank operated at a pressure of 61 pounds per square inch absolute and at a temperature of 100° F. from which it was fed to the fractionator. The bottoms from this fractionator contained the hexane product in an amount of 1.00 gallon mixed with 0.55 gallon of other hydrocarbons, principally octanes and decanes. The overhead amounted to 4.22 gallons per hour, of which 4.02 gallons were isobutane, and the balance principally, n-butane, which was recycled to the reactor. The total feed to the reactor, including recycled material, was 6.67 gallons per hour. The volume of reactor used was 40 gallons, giving an average reaction time of 6 hours. For every gallon of hexane product a fresh feed of 0.87 gallon of ethylene and 1.20 gallons of isobutane were required. The ethylene was completely reacted. The ratio of isobutane to ethylene in the reactor was 5.24 gallons to 0.87 gallon, or substantially a molar ratio of 4 to 1. The amount of catalyst lost, principally in the form of an insoluble complex with hydrocarbons settling out from the reactor amounted to 0.005 gallon per hour, which was compensated for by make up catalyst. The concentration of the aluminum bromide catalyst in the reactor was 0.2 mol per cent.

The particular reactions given above in connection with the description of the drawings and the examples are by way of illustration only and are not to be construed as limiting the invention. As stated in the objects of the invention it is applicable to any low temperature hydrocarbon conversion reaction which may be catalyzed by a hydrocarbon soluble catalyst. The invention is not intended to include within its scope high temperature hydrocarbon conversion reactions such as cracking. The reactions with which this invention is concerned are generally carried on at temperatures below 150 to 200° C., although somewhat higher temperatures may be used in special cases. In general the reactions are characterized in that they do not involve the formation of appreciable amounts of fixed hydrocarbon gases such as hydrogen, methane and ethane by decomposition and cracking of the hydrocarbons undergoing reaction.

Since the reaction with which the invention is concerned involves the use of a hydrocarbon soluble catalyst, a condition of the reaction is that a hydrocarbon be present in the liquid phase. It is essential, therefore, that the reaction temperature be below the critical temperature of the hydrocarbon or hydrocarbon mixture which serves as a solvent for the catalyst. This liquid hydrocarbon is generally one of the reactants in the process, although in special cases where an inert hydrocarbon is added to serve as a carrier for the product in the separation zone, the hydrocarbon reactant or reactants may be introduced as gases for convenience and to produce agitation of the reaction mixture in the reaction zone.

The invention has been illustrated as applying to isomerization, reforming, and condensation reactions in general. Obviously, in addition to the isomerization of normal butane to isobutane the invention is equally applicable to the isomerization of other normal paraffins such as n-pentane, n-hexane and the like to the corresponding isoparaffins, and to the isomerization of the isoparaffins to the normal paraffins should this be desired. The invention is equally applicable to other isomerization reactions such as the isomerization of methyl cyclopentane to cyclohexane, and to isomerization of aromatic hydrocarbons.

Typical condensation reactions which have been used to illustrate the invention are the alkylation reactions, such as the formation of 2,3-dimethyl butane by the alkylation of isobutane with ethylene. Obviously, the invention is applicable to the alkylation of other isoparaffins with other olefins such as pentene, butylene, and propylene, and to the alkylation of isoparaffins with other alkylating agents such as the various alkyl halides, etc. The invention has proven particularly useful in the alkylation of isobutane and ethylene, which reaction is very advantageously carried out in the presence of an aluminum bromide catalyst.

No particular type of concentrating evaporator is required for separation of the product and the catalyst. Where the product is readily volatilized a simple flash evaporator may be used. Where a flash evaporator is used it should be provided with suitable baffle plates to minimize entrainment of higher boiling hydrocarbons and catalyst in the outgoing vapors. Generally, the reaction mixture being fed to the evaporator will be partially vaporized in the heater and the two phases will complete their separation in the evaporator itself. Any suitable heating coil may be inserted in the evaporator. It is generally desirable to operate the evaporator at relatively low pressure in order to reduce the temperature required to vaporize the desired component of the reaction mixture. Where a normally inert gas is used as the stripping agent, such as methane, the gas may be heated prior to introduction into the evaporator wherein it serves as the stripping agent. The essential requirements are the operation of the evaporator under such conditions of temperature, pressure, and heat input that sufficient hydrocarbons are retained in the liquid phase to keep the soluble catalyst substantially completely in solution, and the substantially complete removal of the vapor phase from the evaporation zone before condensation to avoid the return of any substantial amount of the overhead to the liquid phase in the evaporator for further contact with the catalyst or to the reaction zone with the catalyst recycle. Refluxing of liquefied overhead should be avoided insofar as practicable since it will promote possible side reactions of the products as well as permit any high boiling materials, as, for example, heavy alkylate formed in an alkylation reaction or pentanes formed in a butane isomerization process, to accumulate in the reaction zone.

The concentration of the catalyst in the reaction zone should be well below the saturation value in the reaction mixture under the conditions of temperature to be employed in the evaporator since it is desirable to effect a considerable concentration of the reaction effluent in the evaporator recycle, and, therefore, the amount of solvent to be recycled may not be sufficient to retain the catalyst in solution were a high concentration in the reactor employed. This is particularly true in the case of an alkylation reaction where the product is higher boiling than the reactants requiring that a substantial proportion of the hydrocarbons to vaporized to carry over appreciable product. Higher concentrations are usually permissible in isomerization reactions, such as n-butane isomerization, since the product isomer is usually lower boiling than the reactant hydrocarbon, but even in these isomerization reactions, the concentrations of catalyst in the reaction zone should not exceed about 50 to 60% of the saturation value under the vaporization conditions. It is to be realized of course, that there will be some difference in the solubility in the reactor effluent from that in the non-vaporized solvent from the evaporator because of differences in composition of these hydrocarbon mixtures. These differences in the usual case are not generally large, and favor retention of the catalyst in solution since the solubility generally increases in the higher hydrocarbons.

Since these reactions are generally exothermic, suitable cooling means may be found necessary for the reaction zone to maintain the reaction temperature at the desired level. These cooling means may be the conventional cooling coils placed in or around the reactor. One method which has been found particularly useful in controlling the temperature of the reactor is to operate at a pressure so that a portion of the reaction mixture is vaporized as a result of the exothermic heat of the reaction. These vapors are withdrawn from the reaction zone and compressed. A portion of the compressed gases may be condensed and this condensate recirculated to the reaction zone wherein its subsequent vaporization will control the temperature by taking up excess heat of reaction. Another portion of this compressed gas may be recirculated to the bottom of the reaction zone and introduced through a suitable bubble plate. This gas in rising through the reaction zone will produce sufficient agitation for a reaction of this type involving the use of a soluble catalyst.

Since some agitation is desirable even though a soluble catalyst is used, it is frequently desirable to introduce one of the reactants, where two are involved, or a portion of the reactant, where only one reactant is involved into the bottom of the reactor in the gaseous phase to furnish the desired agitation. In those cases in which it is desirable to have a hydrocarbon carrier present to assist in the vaporization of the product from the catalyst in the separation zone, the catalyst may be dissolved in the hydrocarbon carrier and all of the reactant material introduced as a gas.

In the description of the invention and in the drawings, a heater has been interposed between the reaction zone and the separation zone to supply heat for vaporization of the product. In cases where it is undesirable to have the evaporation temperature much or any higher than the reaction temperature the evaporator may be operated at a much reduced pressure to secure the necessary vaporization. Naturally some heat must be supplied in any case to supply the heat of vaporization for the product vapors and for any reactant and carrier vapors formed in the separation zone. A heating coil, placed in the evaporator, will serve to supply the necessary heat as the vaporization occurs.

Since it is generally desirable to feed the product-containing vapor into the fractionator as a liquid, this vapor may be compressed as it leaves the evaporator and recirculated in heat exchange relationship with the evaporator or the evaporator feed, for at least partial condensation of these compressed vapors. The heat condensation of this compressed product-containing vapor will supply part of the heat necessary to evaporate the desired components of the evaporator feed. This has been shown diagrammatically in Figure 2. This return of the heat of evaporation to the evaporator would not be 100 percent complete and some additional heat would be required for the evaporator feed. This amount might be kept to a fairly low value, making it feasible to supply this additional heat to the evaporator feed at a relatively low temperature level, thus minimizing the temperature rise of the evaporator feed.

As mentioned previously in the discussion of Figure 1, a portion of the catalyst must be continuously drawn off for regeneration because of the continuous formation of a complex between the soluble catalyst and the hydrocarbons. Even though this catalyst hydrocarbon complex may have considerable catalytic activity, it is immiscible with the hydrocarbon and tends to accumulate in the bottom of the reaction zone. This catalyst should be drawn off and regenerated to recover the active catalytic compound. The particular method used for regeneration of the catalyst will depend upon the soluble catalyst used. This recovered catalyst will then be returned to the reaction zone. The catalyst recovery will not be 100 percent complete and a small amount of catalyst may likewise be carried over with the reaction products. Some make up catalyst will be required, as is customary in the case of catalytic reactions, and this make up catalyst may be added along with the regenerated catalyst.

In the foregoing description of our invention, the process has been illustrated as applied to a fully continuous process, in which the catalyst containing hydrocarbon mixture is continuously withdrawn from a reactor, circulated to an evaporator from whence the unvaporized, catalyst-containing, portion is continuously returned to the same reactor. Frequently it may be preferable to use a battery of reactors with a single evaporator. In such operation the evaporator would operate continuously, but the operation of each unit in the battery of reactors would be, strictly speaking, discontinuous. That is one reactor would be discharging at all times to the evaporator. The unvaporized hydrocarbon catalyst mixture would be returning to another reactor, which also would be receiving fresh feed for reaction. The remaining reactors in the battery would be temporarily operating as batch reactors. When the contents of the discharging reactor had been removed to a predetermined extent, another reactor would be set to discharge to the evaporator, and the unvaporized material from the reactor set to return to a discharged reactor. Suitable valves would be provided to provide the desired sequence of operation for charging and discharging of each unit in the battery of reactors. The sequence of operation of such a battery of reactors might be a series operation. In such a case the discharge to the evaporator would be constant from the last reactor in the series, and the unvaporized catalyst containing mixture returned to the first reactor. The intermediate reactors would contain reaction mixture in which the reaction had proceeded in varying degrees towards completion. Any other desired sequence of operation might be followed in some of which each reactor unit would be operated for a portion of the time as a batch unit, completely disconnected from the evaporator, and only periodically would discharge to the evaporator and recycling of the feed occur.

This application is a continuation-in-part of our prior application S. N. 448,886, filed June 29, 1942.

Many other modifications of our invention will be apparent to those skilled in the art and therefore only such limitations should be imposed as are indicated in the appended claims.

We claim:

1. The method of conducting a low temperature hydrocarbon conversion reaction in which at least one reactant is a hydrocarbon which comprises conducting the reaction in a reaction zone in the presence of at least one liquid hydrocarbon having dissolved therein a hydrocarbon soluble catalyst characterized by having a boiling point above that of the desired product of the hydrocarbon conversion reaction as the effective catalytic agent, withdrawing liquid reaction mixture containing reaction product, liquid hydrocarbon solvent and dissolved catalyst from said reaction zone, transferring the withdrawn mixture to a separation zone, vaporizing product from the reaction mixture in said separation zone, removing the product vapors from said separation zone before any substantial condensation thereof, regulating the amount of vaporization so that sufficient hydrocarbon remains in the liquid state to act as a solvent for the hydrocarbon soluble catalyst, condensing the product vapors removed from said separation zone so that return of condensed product vapors to the catalyst solution is substantially avoided, recovering product from the condensate, and recycling the unvaporized portion of the reaction mixture containing the dissolved catalyst to the reaction zone.

2. The process of claim 1 in which the catalyst is aluminum bromide.

3. A process for the alkylation of hydrocarbons by the reaction of an isoparaffin with an alkylating agent in which the isoparaffin is reacted in the liquid phase in a reaction zone and in which a hydrocarbon soluble catalyst characterized by having a boiling point above that of the desired alkylate product is dissolved in the isoparaffin which comprises alkylating an excess of the isoparaffin with the alkylating agent in the reaction zone, withdrawing liquid reaction mixture containing alkylate product, excess isoparaffin reactant and dissolved catalyst from said reaction zone, transferring the withdrawn mixture to a separation zone, vaporizing alkylate product from the reaction mixture in said separation zone, removing the alkylate vapor from said separation zone before any substantial condensation thereof, regulating the amount of vaporization so that sufficient hydrocarbon remains in the liquid state to act as a solvent for the hydrocarbon soluble catalyst, condensing the alkylate product vapors removed from said separation zone so that return of condensed alkylate to the catalyst solution is substantially avoided, recovering alkylate product from the condensate, and recycling the unvaporized portion of the hydrocarbon mixture containing the dissolved catalyst to the reaction zone.

4. The process of claim 3 in which the catalyst is aluminum bromide.

5. A process for the alkylation of hydrocarbons by the reaction of an isoparaffin with an olefin in which the isoparaffin is reacted in the liquid phase in a reaction zone and in which a hydrocarbon soluble catalyst characterized by having a boiling point above that of the desired alkylate product is dissolved in the isoparaffin which comprises alkylating an excess of the isoparaffin having the hydrocarbon soluble catalyst dissolved therein with the olefin in the reaction zone, withdrawing liquid reaction mixture containing alkylate product, excess isoparaffinic reactant and dissolved catalyst from said reaction zone, transferring the withdrawn mixture to a separation zone, vaporizing product from the reaction mixture in said separation zone, removing the alkylate product vapors from said separation zone before any substantial condensation thereof, regulating the amount of vaporization so that sufficient hydrocarbon remains in the liquid state to act as a solvent for the hydrocarbon soluble catalyst, condensing the product vapors removed from said separation zone together with isoparaffinic reactant vaporized therewith so that return of condensed vapors to the catalyst solution is substantially avoided, transferring the condensed isoparaffin-alkylate mixture to a fractionation zone and therein separating the excess isoparaffinic reactant and product, recycling the isoparaffin to the reaction zone, recycling the unvaporized portion of the reaction mixture containing the dissolved catalyst to the reaction zone, and recovering the alkylate product.

6. A process for the isomerization of hydrocarbons which comprises conducting the reaction in a reaction zone with the hydrocarbon to be isomerized in the liquid phase and having dissolved therein a hydrocarbon soluble catalyst characterized by having a boiling point above that of the desired product isomer as the effective catalytic agent, withdrawing liquid reaction mixture containing product isomer, the hydrocarbon and dissolved catalyst from said reaction zone, transferring the withdrawn mixture to a separation zone, vaporizing product isomer from the reaction mixture in said separation zone, removing the product vapors from said separation zone before any substantial condensation thereof, regulating the amount of vaporization so that sufficient hydrocarbon remains in the liquid state to act as a solvent for the hydrocarbon soluble catalyst, condensing the product isomer vapors removed from said separation zone together with any vapors of the hydrocarbon to be isomerized so that return of the condensed vapors to the catalyst solution is substantially avoided, transferring the condensed vapor mixture to fractionation zone and therein separating the hydrocarbon isomer from the hydrocarbon to be isomerized, recycling the unreacted hydrocarbon to be isomerized to the reaction zone, recycling the unvaporized portion of the reaction mixture containing the dissolved catalyst to the reaction zone, and recovering the product isomer.

7. The process of claim 6 in which the catalyst is aluminum bromide.

MANUAL H. GORIN.
WILL SWERDLOFF.